(12) United States Patent
Rainbow

(10) Patent No.: US 11,804,025 B2
(45) Date of Patent: Oct. 31, 2023

(54) METHODS AND SYSTEMS FOR IDENTIFYING TOPOGRAPHIC FEATURES

(71) Applicant: Ordnance Survey Limited, Southampton (GB)

(72) Inventor: Jacob Guy Rainbow, Southampton (GB)

(73) Assignee: Ordnance Survey Limited, Southampton (GB)

( * ) Notice: Subject to any disclaimer, the term of this patent is extended or adjusted under 35 U.S.C. 154(b) by 464 days.

(21) Appl. No.: 16/934,361

(22) Filed: Jul. 21, 2020

(65) Prior Publication Data

US 2021/0027055 A1   Jan. 28, 2021

(30) Foreign Application Priority Data

Jul. 24, 2019 (EP) .................................. 19188012

(51) Int. Cl.

| | |
|---|---|
| G01V 9/00 | (2006.01) |
| G06V 20/10 | (2022.01) |
| G06V 10/44 | (2022.01) |
| G06F 18/21 | (2023.01) |
| G06V 10/764 | (2022.01) |
| G06V 10/82 | (2022.01) |

(52) U.S. Cl.
CPC ............ *G06V 10/454* (2022.01); *G01V 9/005* (2013.01); *G06F 18/2163* (2023.01); *G06V 10/764* (2022.01); *G06V 10/82* (2022.01); *G06V 20/176* (2022.01); *G06V 20/182* (2022.01)

(58) Field of Classification Search
CPC .... G06V 10/454; G06V 10/82; G06V 20/182; G01V 9/005; G06F 18/2163
See application file for complete search history.

(56) References Cited

U.S. PATENT DOCUMENTS 10,551,177 B2 *   2/2020   Morimoto ............ G01B 11/254

OTHER PUBLICATIONS

Marmanis et al., "Semantic Segmentation of Aerial Images with an Ensemble of CNNS," ISPRS Annals of Photogrammetry, Remote Sensing and Spatial Information Sciences, Jun. 6, 2016, pp. 473-480.
Anonymous, "Why Normalize Images by Subtracting Dataset's Image Mean, Instead of the Current Image Mean in Deep Learning? Cross Validated," May 8, 2016.
Jan. 20, 2020—Extended EP Search Report—Application No. 19188012.9.

* cited by examiner

*Primary Examiner* — Manuel A Rivera Vargas
(74) *Attorney, Agent, or Firm* — Banner & Witcoff, Ltd.

(57) ABSTRACT

Computer-implemented methods and systems for identifying topographic features that optimises and subsequently implements a machine learning model to automatically classify and extract topographic features from a set of target imagery are described herein. In particular, the optimised machine learning model creates heat maps from the target imagery corresponding to each class of feature, wherein the intensity of each pixel indicates whether a certain type of feature is present. The resulting heat maps are then processed to transform each pixel, specifically those identifying a topographic feature, into a geospatial vector.

19 Claims, 15 Drawing Sheets
(10 of 15 Drawing Sheet(s) Filed in Color)

METHODS AND SYSTEMS FOR IDENTIFYING TOPOGRAPHIC FEATURES

FIELD

Aspects described herein relate to a computer implemented method and system for identifying topographic features. In particular, aspects relate to a computer-implemented method of identifying topographic features that optimises a machine learning model for a geographic area to automatically classify and extract topographic features from a set of target imagery thereof, and systems for performing the same.

BACKGROUND

Most providers of digital maps rely on a very detailed topographical map database which stores the underlying data. For example, Ordnance Survey uses the very large scale topographic product OS MasterMap®, which records every feature larger than a few metres in one continuous dataset, and is constantly being updated.

A topographic feature is an abstraction of a real-world object. It is not the real-world object itself. For instance, the OS MasterMap® product is composed of discrete vector features, each of which has a feature type, geometry, and various feature attributes. More details about this product can be found in the manual OS MasterMap® Topography layer—User guide and technical specification, v 1.12-03/2014.

One technique used to obtain and update the vector features of the topographic data is to process aerial imagery and extract the vector information therefrom. However, the current methodology is agnostic to the class of feature being detected and so this requires the features within the imagery to be manually identified and labelled before the vector information can be extracted. Such methods are labor intensive and very time consuming, for example, it can take up to eight hours to extract all of the building polygons for one kilometre of a densely built up area.

Some methods of automatic feature extraction are currently known. In particular, one known model is trained by using a technique called "Active Learning", whereby a light-weight learning algorithm is able to interactively present the user with proposed label targets, generally speeding up the training data collection process. These data are then used to train a more robust network which detects bounding boxes of building footprint proposals. A considerable amount of post-processing and manual editing is then required to turn these proposals into accurate building polygons. Whilst such methods can be generally applied to vast regions, up to 25% human intervention is required in order to accurately extract the topographic features therefrom.

SUMMARY

Aspects described herein address the above noted problems by providing a computer-implemented method and system for identifying topographic features that optimises and subsequently implements a machine learning model to automatically classify and extract topographic features from a set of target imagery. In particular, the optimised machine learning model creates heat maps from the target imagery corresponding to each class of feature, wherein the intensity of each pixel indicates whether a certain type of feature is present. The resulting heat maps are then processed to transform each pixel, specifically those identifying a topographic feature, into a geospatial vector. In doing so, aspects described herein bypass the Active Learning model currently known in the art in favour of creating a bespoke deep network that performs well on the target geographic region. This is particularly important for different geographic regions, since the characteristics of each region, such as the structure of the roads, buildings and surrounding terrain, can vary significantly from region to region. Furthermore, a pixel-wise feature mask is created in a single inference run without needing to create the bounding box by-product. Consequently, one or more aspects are able to automatically extract topographic features to produce high-accuracy regional maps, with minimal or zero human intervention required.

A first aspect provides a computer-implemented method of generating a machine learning system for automatically identifying topographic features from image data corresponding to a geographic area, wherein the method comprises receiving image data comprising at least a first image corresponding to a first geographic area, the first image comprising a plurality of pixels, processing the image data, wherein at least a portion of the first image is normalised in dependence on at least one spectral band of the plurality of pixels, labelling one or more topographic features of at least a first type within the processed image data, generating at least one further image from the processed image data in dependence on the labelling, wherein each of the plurality of pixels has a value associated therewith such that pixels corresponding to the one or more topographic features of the first type have an integer value, providing a pre-trained machine learning system configured to identify objects from image data, and optimising the pre-trained machine learning system based on the at least one further image, wherein the optimised machine learning system is adapted to automatically identify topographic features of the at least a first type from target image data corresponding to at least the first geographic area.

As such, the image data is pre-processed so as to normalize the imagery according to at least one spectral band. Preferably, for the purposes of identifying features such as roads and buildings, the imagery will be normalized according to three spectral bands for example, the Red, Green and Blue spectral bands. By normalizing the image data based on colour, this ensures that bright spots, which may constitute part of the spectral signature of the feature to be extracted, correspond to the same intensity of similar bright spots in the training samples of the machine learning system used to extract the features. This drastically improves the capability of the model to reliably generalize different geographical regions and extract features therefrom.

Furthermore, by labelling the initial imagery according to feature type, further imagery can be generated from the normalized image data, in which the pixels containing a specific type of topographic feature that is to be extracted are given an integer value. Pixels not containing that type of feature may be given a zero value or some other integer value. For example, pixels containing roads may have a value of 1, pixels containing buildings may have a value of 2, whilst all other pixels have a zero value. This enables large amounts of training data to be generated quickly and efficiently by filtering the image data based on whether a training feature is present.

Consequently, a pre-trained machine learning system that is already trained to identify real-world objects from imagery can be optimised for that specific type of topographic feature. In doing so, a bespoke machine learning system can be generated that is able to accurately identify the target topographic features in the given geographic area, as well as other geographic areas having similar topography.

Processing the image data may further comprise dividing the first image into a plurality of image tiles. In such cases, the intensity of the pixels within each image tile may be normalised in dependence on a statistical analysis of the at least one spectral band of the plurality of pixels. For example, the mean, standard deviation and histogram distribution across the whole of the image data for each spectral band being used can be calculated and then applied to the individual tiles.

Generating at least one further image may comprise dividing the plurality of image tiles into a plurality of sub-tiles, wherein sub-tiles containing a pre-determined number of pixels having an integer value are identified for input to the pre-trained machine learning system. This further helps to improve the efficiency with which training data can be generated since sub-tiles that do not contain a type of topographic feature or do not contain a sufficient amount of a type of topographic feature that is to be identified can be disregarded, whilst sub-tiles containing said topographic features can be used to optimise the machine learning system. In this respect, sub-tiles having less than the pre-determined number of pixel of a particular type of topographic feature, for example, 100 pixels or less, may be disregarded.

Generating at least one further image may also comprise generating an image for each type of topographic feature. That is to say, for each type of topographic feature that is to be identified, a separate image may be generated for input to the machine learning system.

The step of labelling one or more topographic features of at least a first type may comprise generating a vector mask. From this vector mask, single band raster labels having integer-valued pixels can be easily produced for every region associated with a distinct class of vector polygon for input to the pre-trained machine learning system.

The at least a first type may be at least one of: a building, and a road.

A further aspect provides a computer-implemented method of automatically identifying topographic features from image data corresponding to a geographic area, wherein the method comprises receiving target image data corresponding to a geographic area of interest, inputting the target image data to an optimised machine learning system, wherein the optimised machine learning system is adapted to automatically identify topographic features of at least a first type from the target image data corresponding the geographic area of interest, generating, using the machine learning system, at least one heat map of the geographic area of interest, the at least one heat map comprising a plurality of pixels having an intensity value, wherein the intensity value is calculated in dependence on at least the first type of topographic feature, and processing the pixels of at least one heat map to thereby identify one or more topographic features of at least the first type.

As such, once a machine learning system has been optimised, preferably in accordance with the methods described above, target imagery of a geographic area of interest may be input to identify topographic features of a particular type. Specifically, the machine learning system generates a heat map of the geographic area of interest corresponding to each type of topographic feature to be identified. The pixels of the heat map have an associated intensity that is calculated based on whether the topographic feature is present. For example, for buildings, the pixels corresponding to buildings within the target image data will be brighter than the pixels not containing buildings, from which the location and shape of topographic features can be identified.

The step of generating at least one heat map may comprise analysing a pixel of the target image data, and determining a confidence measure based on a probability that the pixel corresponds to at least the first type of topographic feature, wherein the intensity of the pixel is indicative of the determined confidence measure. That is to say, the pixels will be analysed to provide a confidence measure that measures the likelihood that the pixel contains a particular type of topographic feature, wherein the intensity of the pixel is proportional to the confidence measure. For example, pixels with a confidence measure of about >70% will be significantly brighter than pixels with a confidence measure of <20%.

As such, the processing the pixels of the at least one heat map may further comprise identifying one or more topographic features in dependence on the determined confidence measure. In this respect, pixels having a confidence above a certain confidence measure may be identified as being a specific type of topographic feature. For example, pixels in the heat map for buildings with a confidence score above about 70% may be identified as a building, whilst pixels in the heat map for roads with a confidence score above about 20% may be identified as a road.

The method may further comprise generating one or more geospatial vectors in dependence on the identified topographic features. That is to say, the geospatial position and shape of the identified topographic features can be derived from the heat map.

The one or more geospatial vectors may then be post-processed to confirm the feature identification and detect any uncertain regions. In cases where the identified topographic features are buildings, the method may further comprise processing the one or more geospatial vectors to align an orientation of the one or more geospatial vectors. In cases where the identified topographic features are roads, the method may comprise processing the one or more geospatial vectors to thereby generate a set of LineString geometries.

The method may further comprise processing the image data to provide a plurality of image tiles for input to the optimised machine learning system, wherein each sub-tile has a portion of overlap with an adjacent sub-tile. For example, each sub-tile may have a half-tile overlap with the adjacent sub-tiles. Similarly, the image tiles may be provided with a half-tile buffer around its edge. In doing so, each pixel is processed by the machine learning system a plurality of times, specifically four times in the case of a half-tile overlap, wherein the average intensity is calculated for the final heat map.

In such cases, generating the at least one heat map of the first geographic area may comprise generating a respective heat map for each sub-tile, wherein each respective heat map are summed together to provide the at least one heat map. As noted above, the average intensity for each pixel within each overlapping portion may calculated to provide the final heat map.

A further aspect provides a system for automatically identifying topographic features from image data corresponding to a geographic area, the system comprising a) one or more processors, and b) at least one computer-readable storage medium, the computer readable storage medium storing one or more computer programs so arranged such that when executed by the one or more processors they cause the one or more processors to perform the method of automatically identifying topographic features described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features and advantages various aspects will become apparent from the following description of embodiments thereof, presented by way of example only, and by reference to the drawings, wherein.

DETAILED DESCRIPTION

Figure 1:
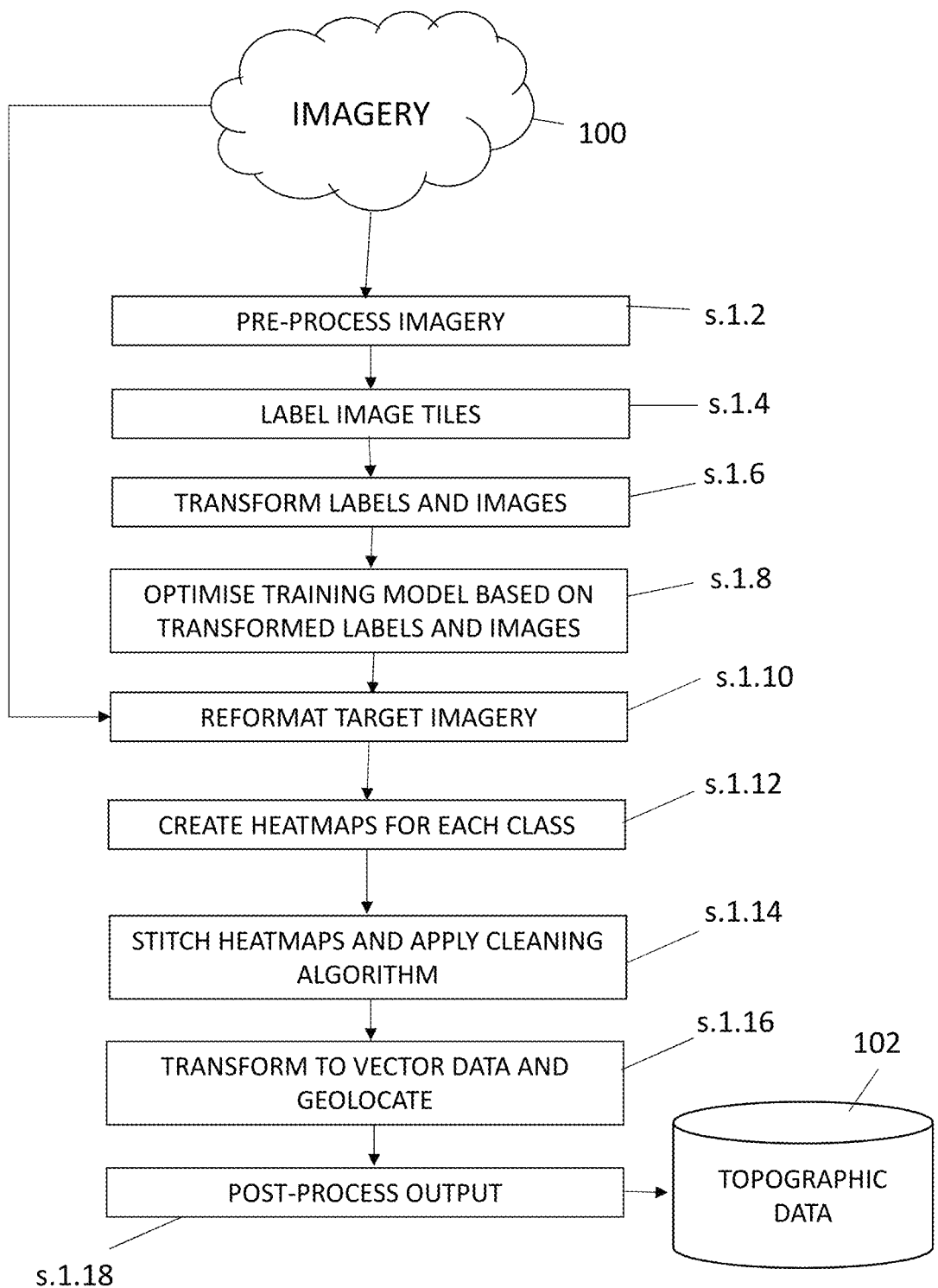
FIG. 1 is a flow diagram illustrating a method of automatically extracting vector information from raster images according to one or more illustrative aspects described herein.

Aspects described herein provide a computer-implemented method of automatically extracting vector information, specifically the vertices of features, from raster information obtained from satellite or aerial image, the steps of which are illustrated by FIG. 1, and systems for performing the same.

Figure 2:
FIG. 2 is a diagram illustrating part of the method according to one or more illustrative aspects described herein.
Figure 3:
FIG. 3 is a diagram illustrating part of the method according to one or more illustrative aspects described herein.

In the first step 1.2, raster imagery 100 of a geographic area is received and pre-processed. The geographic area may be any area suitable for providing training data for a particular geographic region, providing a stratified sample that covers all of the relevant topographies for that region. For example, for the UK, imagery 100 covering both rural, residential and industrial areas may be received. The imagery 100 is preferably airborne imagery including aerial imagery and/or satellite imagery. The imagery 100 is pre-processed to divide the imagery 100 into normalised, colour-balanced tiles. The imagery 100 may be divided into tiles of any suitable size, for example, tiles representing an area of around 1 km$^2$. The imagery 100 contains several bands of non-integer spectral data, that is, several bands corresponding to a wavelength within a particular range. However, the feature detection described below is most effective when using three-band imagery. As such, the imagery 100 is normalized so that the Red, Green and Blue (RGB) bands are selected from the original image mosaic of the whole geographic area. Statistics are computed for each channel, for example, the mean, standard deviation and histogram distribution so that any single tile can be normalized in the same way. Once the statistics for each channel, that is, each of the RGB bands, have been calculated, they may be applied to each individual image tile. This may be done by converting the band intensities into a standard normal distribution by subtracting the mean and dividing by the standard deviation. Then, each channel (R, G, and B) is clipped above the brightest pixels and below the darkest of pixels, for example, all pixels above the 98$^{th}$ percentile for brightness are replaced with the value at the 98$^{th}$ percentile and all pixels below the 1$^{st}$ percentile for brightness are replaced with the value at the 1$^{st}$ percentile. This serves to remove anomalies before the bit-depth is reduced. The resulting intensities may then be converted to 8-bit integers and saved as an uncompressed image file. FIG. 2 provides an example of the raw imagery, rendering the first three bands as RGB. FIG. 3 shows the same scene after the normalization process has been carried out, where the output is now an 8-bit image file with only three bands, and wherein the shadows have been slightly boosted and the burnout reduced.

By normalizing the imagery 100 based on colour, this ensures that bright spots, which may constitute part of the spectral signature of the feature to be extracted, correspond to the same intensity of similar bright spots in the training samples of the model used to extract the features, as will be described in more detail below. This drastically improves the capability of the model to reliably generalize different geographical regions and extract features therefrom.

Figure 4:
FIG. 4 is a diagram illustrating part of the method according to one or more illustrative aspects described herein.

In the next step 1.4, the image tiles are labelled with vector masks for each feature to be detected. That is to say, for each type of feature that is to be extracted, for example, roads and buildings, the image tiles a processed so as to label any instances of these features. The vector masks may be created using any suitable software that enables the creation of a shapefile containing the location and shape of the feature via the vertices of said feature. An example of this is shown by FIG. 4, in which a road is labelled with a vector mask 402. This will be done for a plurality of tiles corresponding to a training region that covers a variety of landscapes, for example, areas containing a variety of different types of buildings, roads, landmarks and the like, to ensure that the model is provided with a range of features from which to train.

In the case of very small buildings, or instances occluded by cloud or vegetation, a specific set of rules may be implemented. For each tile, all buildings and man-made built structures that are more than about 50 square metres will be vectorised as a shapefile, with all of the building shapefiles for each tile being aggregated together. A number of rules for labelling the buildings with a vector mask may then be implemented, for example:

If a building is partly or wholly occluded by cloud cover, it is not labelled.

If a building is partly tree-occluded, the location of the roof may be assessed manually.

If two or more buildings are fully connected across at least one façade (for example, a terrace of separate houses), they are labelled as a single building.

All other ambiguous cases will not be labelled.

Small details that are less than 5 pixels from the main building hull can be ignored.

If a building is less than about 2000 square metres, the building is to be labelled using 10 or less vertices, preferably, about 4 vertices.

The geographic coordinate system is maintained for each tile.

A similar set of rules is provided for roads and can be adapted for any class.

Figure 5B:
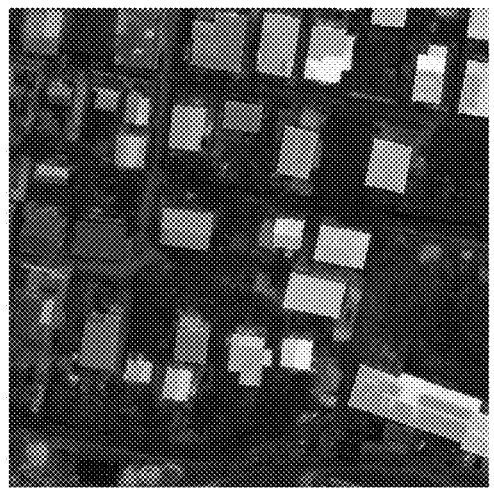
FIGS. 5A and 5B illustrate part of the method according to one or more illustrative aspects described herein.
Figure 5A:

In the next step 1.6, the labels and images are transformed into a format that is suitable for the machine learning model. Here, the image tiles are further divided into smaller sub-tiles, for example, 400×400 pixels. For each sub-tile, a separate raster image is created for all of instances of each class of feature within the sub-tile. For a single 1 km tile at 30 cm ground sampling distance (GSD), this is equivalent to creating a 3333×3333 pixel lattice and filling it with zeros for every pixel that does not at least partially overlap one of the vector class polygons. It is this raster image that is used as the input to the machine learning model (via the tiling process described below). As such, single-band raster labels having zero-valued pixels are produced for every equivalent pixel in the aerial image 100 where no class of feature is present, whilst single-band raster labels having integer-valued pixels are produced for every region associated with a distinct class of vector polygon. A further distinction is that a raster label is only created if the class occupies at least 100 pixels. This makes training more efficient by removing sub-tiles that only have a very small part of a class visible (for example, the edge of a road cutting the corner of the sub-tile). FIG. 5*a* shows an example of a raster image for "roads" overlaid on the original image tile, whilst FIG. 5*b* shows the raster image for "buildings" overlaid on the original image tile.

The preprocessing of the training labels in this way is necessary to convert the original vector input label into a raster label, as required by the machine learning algorithm. This is so that each image pixel has a one-to-one correspondence with an equivalent label. In doing so, large amounts of training data can be generated quickly and efficiently. The efficiency is in part due to tiles being initially filtered based on whether a training feature is present. If it is not, it is disregarded. In tiles of sparse building density, this vastly improves efficiency.

In the next step 1.8, a deep learning network model is compiled using weights from a pre-trained network on the Common Objects in Context (COCO) dataset. The network parameters are then refined to optimise the pre-trained model according to the new topographic objects dataset created in step 1.6. That is to say, the training data generated in step 1.6 is input to the pre-trained model so as to re-train the machine learning model to identify the topographic features within said training data.

In particular, the number of classes needs to match the number of neurons in the final network layer (for example, 4 neurons for 'buildings', 'roads', 'vegetation', 'water'). The rate at which the neural network adapts (i.e. the 'learning rate') is reduced by a factor of 100, so that any changes in the network weights occur at suitably small increments. It will be appreciated that any suitable machine learning model may be used, for example, a deep neural network or the like. Specifically, the machine learning is adapted to receive imagery and labels as discussed above, and a custom choice of parameters are chosen to so that the network is best able to retrain on the task at hand, that is, the specific geographic region. In particular, a compromise needs to be met between the COCO pre-trained model, which can be applied generally to any region but without the same level of accuracy, and the topographically-fine-tuned model for the specific geographic region or a different geographic region having a similar topography. The pre-trained model comprises a plurality of layers with a varying degree of detail; the early layers which detect edges and textures do not require a vast amount of re-training, whereas the later layers which delineate between classes are those that require refining for the specific geographic region. In training the model, the training data created in step 1.6, that is, the raster images and labels for each tile in which topographic features such as roads and buildings have been identified, can then be used to refine each layer appropriately. For example, an early layer might already delineate the difference between green and blue objects, which is useful for Vegetation and Inland Water classes respectively, and so this will not require much refinement for the purposes of identifying roads and buildings. On the other hand, the final layer in the pre-trained model separates disparate classes (for example, 'Duck' from 'Broccoli') and will need considerable refinement to be repurposed, for example, as a building detector.

Once steps 1.2-1.8 have been performed, the optimised machine learning model can be used to automatically detect topographic features in a set of target images, wherein the set of target images may be of the same geographic area used to train the model or of a different geographic area having similar topography. For example, if imagery of different parts of the UK have been used to optimise the machine learning model, the optimised machine learning model may be used to automatically detect topographic features across the UK, as well as any other geographic regions having a similar topography.

Figure 6:
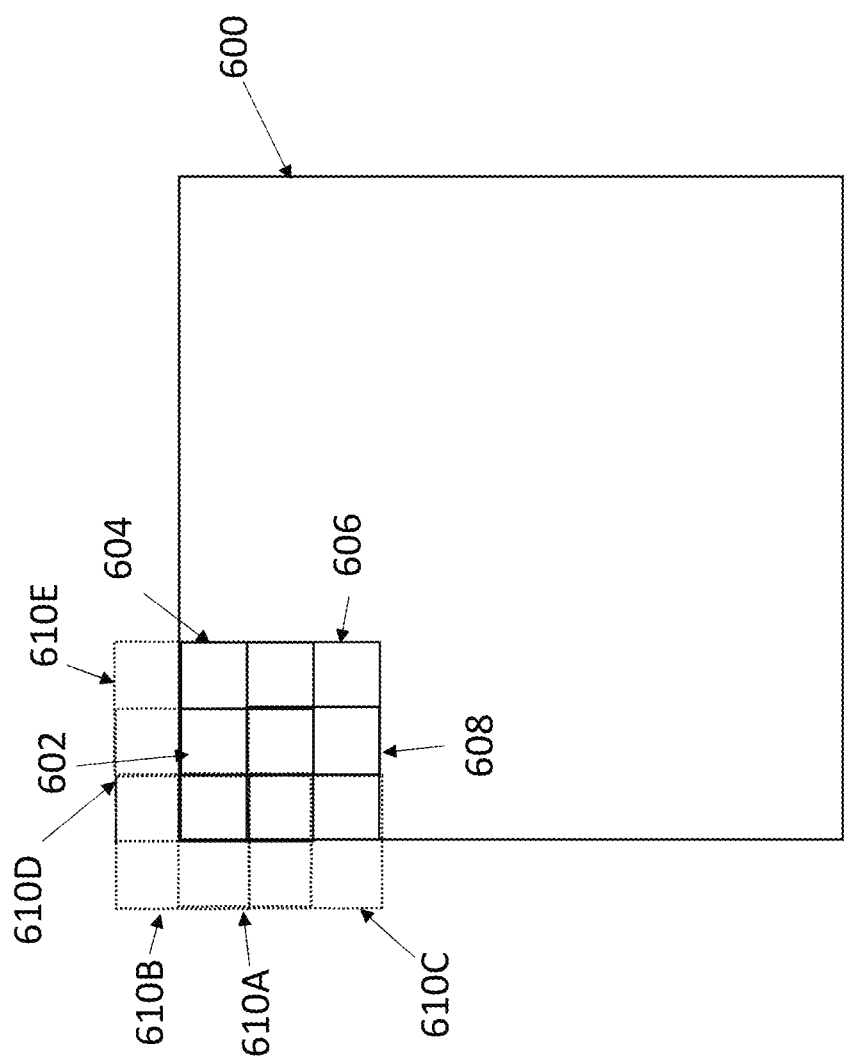
FIG. 6 is a diagram illustrating part of the method according to one or more illustrative aspects described herein.

At step 1.10, the target imagery is received and reformatted into appropriate sub-tiles for input to the optimised machine learning model. For example, as with the imagery used to obtain the training data in step 1.6 above, the target imagery may be divided into sub-tiles of 400×400 pixels. Here, the sub-tiles are created with a half-tile overlap (also commonly referred to as "striding") and an additional buffer around the edge of the original tile. For example, as illustrated by FIG. 6, the imagery has been divided into tiles 600 covering a certain geographic area, say 1 km$^2$. The tile 600 has then been divided into sub-tiles 602, 604, 606, 608 (only four are shown here for illustration purposes), all having a half-tile overlap their respective adjacent tiles. Additional buffer sub-tiles 610A-E are also provided around the edge of the tile 600. In doing so, every pixel within the tile 600 is covered by four sub-tiles 602, 604, 606, 608 or buffer sub-tiles 610A-E, which means that each pixel is processed four times, as will be described in more detail below. It will of course be appreciated that the striding and buffering may be of any suitable size, for example, a quarter-tile overlap and buffer.

Figure 7C:
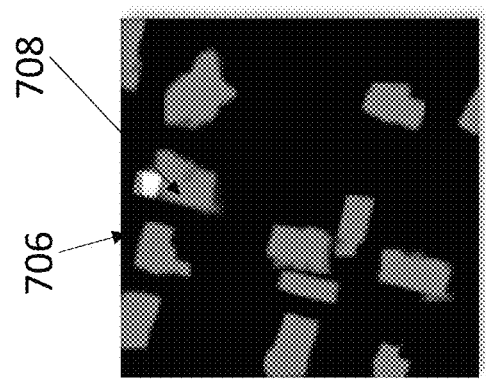
FIGS. 7A-C illustrate part of the method according to one or more illustrative aspects described herein.
Figure 7B:
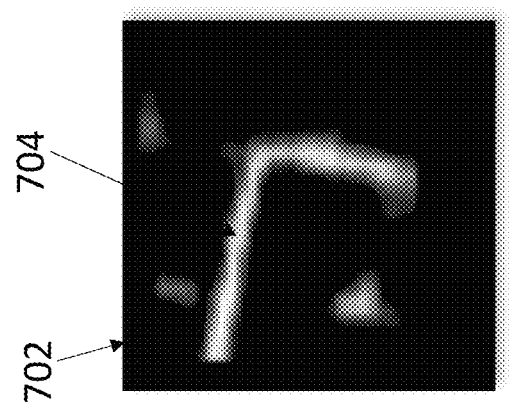
Figure 7A:

At step 1.12, the optimised machine learning model is used to create raster heat maps of each class of features for each sub-tile. Instead of producing binary raster images of all the pixels associated with each class, a heat map is created, for example, an 8-bit heat map, wherein the intensity of each pixel is proportional to the confidence of its classification. To do this, the optimised machine learning model applies a rule in which each pixel is analysed to determine whether it corresponds to a particular class of feature, each pixel being given a "confidence" score as to the probability that the pixel does indeed show a feature of that classification. Said rule needs to be class specific, as some features are easier to detect than others. For example, a pixel that corresponds to a residential building such as a house may have a confidence score of >80% for the "building" class, and a confidence score of <5% for the "road" class. As such, one rule is that any confidence value in the range 50-70% as a building is treated as a false positive, whereas anything over 50% confidence as a road is treated as a true positive. It will be appreciated that this ruleset may vary for different geographies, for example, metaled roads are easier to detect than mud tracks. This process is exemplified by FIGS. 7A-C. FIG. 7A shows an example of a sub-tile 700 created in step 1.10 from the target imagery, which is then input to the trained machine learning model to generate the heat maps shown in FIGS. 7B and 7C. In this respect, FIG. 7B shows the resulting 'road' heat map 702, wherein the pixels having a relatively higher confidence score (generally labelled 704), for example, above 60% are shown to have a higher intensity than the remaining pixels within the sub-tile 700. Similarly, FIG. 7C shows the resulting 'building' heat map 706, wherein the pixels having a relatively higher confidence score (generally labelled 708) are shown to have a higher intensity than the remaining pixels within the sub-tile 700. As discussed above, each sub-tile is created with a half-tile overlap and an additional buffer around the edge of the original tile. Consequently, each pixel is analysed and classified four times in the four different quadrants of the sub-tile. In this respect, the final confidence score and corresponding intensity may be the average value of these four classifications, using any suitable statistical measure such as mean, median or mode.

Figure 8:
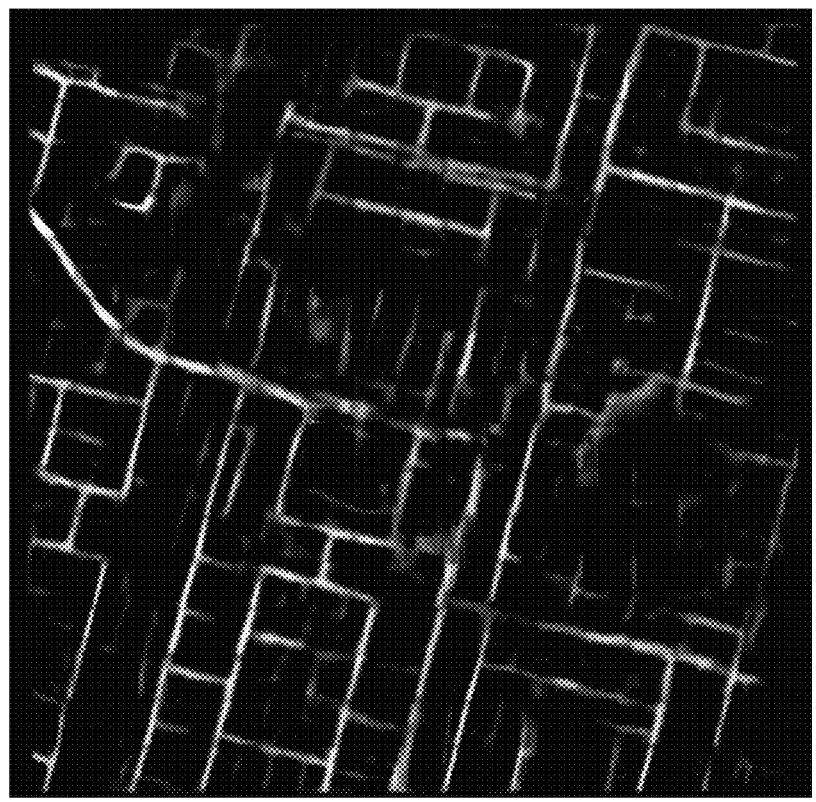
FIG. 8 is a diagram illustrating part of the method according to one or more illustrative aspects described herein.
Figure 9:
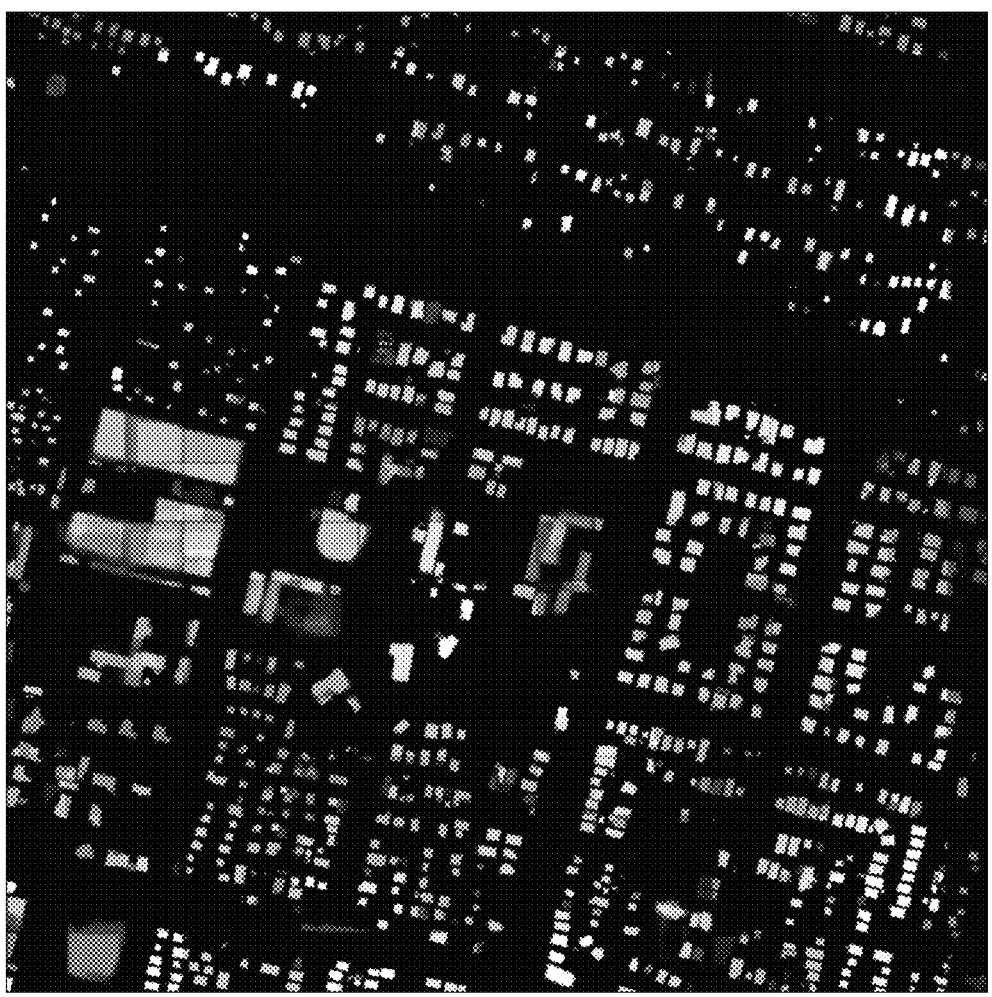
FIG. 9 is a diagram illustrating part of the method according to one or more illustrative aspects described herein.

Once the individual sub-tiles have been classified, the heat maps for each class are stitched together and a cleaning algorithm is implemented to remove any small regions with very low confidence scores (step 1.14). The cleaning algorithm implemented will depend on the class; for example, confident road regions are dilated along their principle axes to give a greater chance of dissolving into other parts of the same road, thereby serving to remove some examples of vegetative occlusion. In the case of buildings, very small, isolated low intensity regions within a larger more confident region are filled in. This fills in holes where the edge of the building is clear, but there may be some ambiguity in the middle (for example, a low, internal roof). To stitch the heat maps corresponding to each sub-tile together, the heat maps are labelled by their (x,y) co-ordinates in relative space. They are then stacked according to the (x,y) coordinates and summed together to produce a heat map for each class covering the whole geographic area of interest. If each image sub-tile comprises 8 bits, then a half-tile stride summation creates a 10-bit image, which is then radiometrically sub-sampled back down to 8-bits using a min-max stretch normalization, that is, by subtracting the global minimum pixel value within each tile and dividing by the global range of pixel values within each tile. FIG. 8 provides an example of a final road heat map for a geographic area of interest, whilst FIG. 9 provides an example of a final building heat map.

Once the heat maps for the whole geographic area of interest have been generated, the underlying classification data is geolocated and converted to a vector format (step 1.16).

Figure 10:
FIG. 10 is a diagram illustrating part of the method according to one or more illustrative aspects described herein.

In this respect, the heat maps are analysed for a particular class that represents a good candidate for an output feature classification at a particular confidence level, for example, pixels in the building heat map with a confidence score above 70% may be identified as a good candidate, whilst pixels in the road heat maps with a confidence score above 20% may be identified as a good candidate. In this respect, road features typically have a weaker spectral signature, that is, they are less well defined by textures and edges than buildings, and so a lower threshold of confidence is required in order to identify road features from the heat maps. It will however be appreciated that any suitable threshold may be applied depending on the particular class and geographic area being analysed. Where a good candidate is identified, the geographic position information embedded within the associated image, for example, the geographic coordinate measured by the aircraft or satellite at the time the original image was captured, and uses it to geolocate a rasterized version of the heat map. All that is required for this process is the geotransform metadata, detailing the coordinate reference system, the coordinates of the top left pixel, and the ground sampling distance of each subsequent pixel. In this respect, the accuracy of the geographic position measured by the aircraft or satellite may be authenticated using known ground control points located within the geographic area being imaged. The georeferenced raster image for each class, for example, buildings, roads and the like, is then converted into a geospatial vector by creating a vertex at every corner boundary between a class pixel and a background pixel. As an example, FIG. 10 shows a raster image 1000 of a geographic area overlaid with the geospatial vectors 1002 for buildings identified from the corresponding building heat map.

Finally, the vector output from step 1.16 undergoes a method of post-processing to confirm the feature extraction and detect any uncertain regions (step 1.18). Here, the post-processing depends on the type of feature classification.

For buildings, a regularization algorithm is used to clean and orthogonalize the raw output classifications. This works by fitting nested rectangles into a building polygon instance by least squares regression, striking a balance between geometric fidelity and orthogonal partiality. For example, the boundary line of each building may be simplified by successively removing vertices that minimally change the geometry. The length and orientation of each boundary line is then calculated, and a weighted average of the orientations is computed to find the primary axis of the building. A square lattice is drawn at this orientation, with squares that mainly lie under the original polygon are identified as parts of the building. A new boundary may then be drawn around these dissolved squares.

Figure 14:
FIG. 14 is a diagram illustrating part of the method according to one or more illustrative aspects described herein.

To detect uncertain regions, the raster heat map output is stratified at two levels (for example, 70% confident and 40% confident) in order to select features that are present at the lower confidence but absent at the higher confidence. This is usually evidence that a feature is present, but that the geometry is uncertain and requires manual editing. A shapefile containing the geospatial vector data for the less confident outputs from the heat map may be created to indicate regions where the above method detected evidence of a building, but was not confident of the geometry. An example of an unconfident region that requires manual editing is provided by FIG. 14. This is more likely to happen for large buildings, where the geometry may be complex and there are fewer comparable training samples.

Buildings that are in the higher confidence level are then subjected to two further stages of processing. Firstly, a Probabilistic Hough Transform is performed on a cropped image of the building candidate to find prominent edges. If an edge from the classification vector is approximately tangential to an edge from the Hough Transform, then new edge vertices are created by intersecting the Hough edge with the two vector edges adjacent to the prominent edge. Secondly, a primary orientation attribute is added to every building object, created by calculating the gradient of the longest edge in each building vector. A secondary orientation is also created, which is rotated 90 degrees relative to the primary orientation. A sliding window of 400 pixels convolves across an image tile calculating these local attributes. For each frame, a histogram is computed with 5-degree bins for the primary orientation. This is used to find the modal building orientation for a region. If the primary or secondary orientation of any building instance is within a specified tolerance of this mode (for example, 15 degrees for a region where the buildings are known to align such as Manhattan, or 5 degrees for a more random distribution of building orientations such as South London), then the building vector is rotated to align with its surrounding buildings. For highly-homogeneous building regions, this creates a more realistic unidirectional lattice. This helps to greatly improve the accuracy of the final vector output, especially in 'Manhattan'-type building regions, where the buildings are arranged in a grid-like layout and there is a high probability of feature alignment. The improved accuracy is owed to the empirical fact that a building is likely to have a similar orientation to its neighbour.

Figure 11:
FIG. 11 is a diagram illustrating part of the method according to one or more illustrative aspects described herein.
Figure 12:
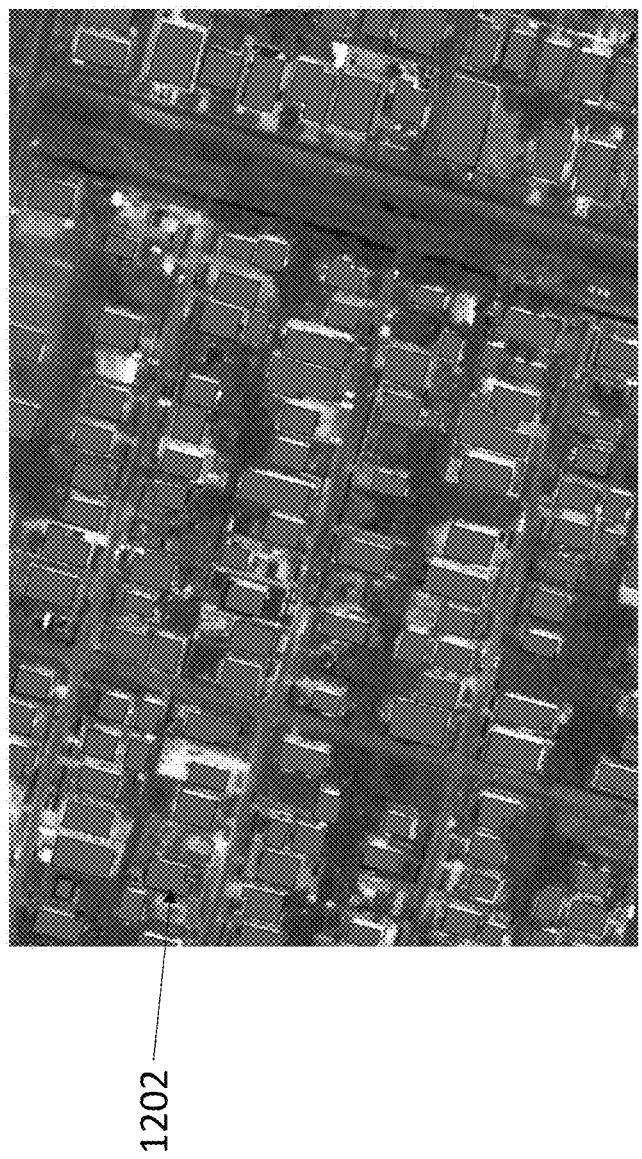
FIG. 12 is a diagram illustrating part of the method according to one or more illustrative aspects described herein.

An example of this post-processing for buildings is shown in FIGS. 11 and 12. FIG. 11 illustrates an image tile prior to any post-processing, wherein the orientation of each the building vector polygons 1102 are not aligned with respect to the vector polygons of the surrounding buildings. FIG. 12 illustrates a part of the image tile following the post-processing in which all of the building vector polygons 1202 have been aligned along two orientations to create a grid of vector polygons.

Figure 13:
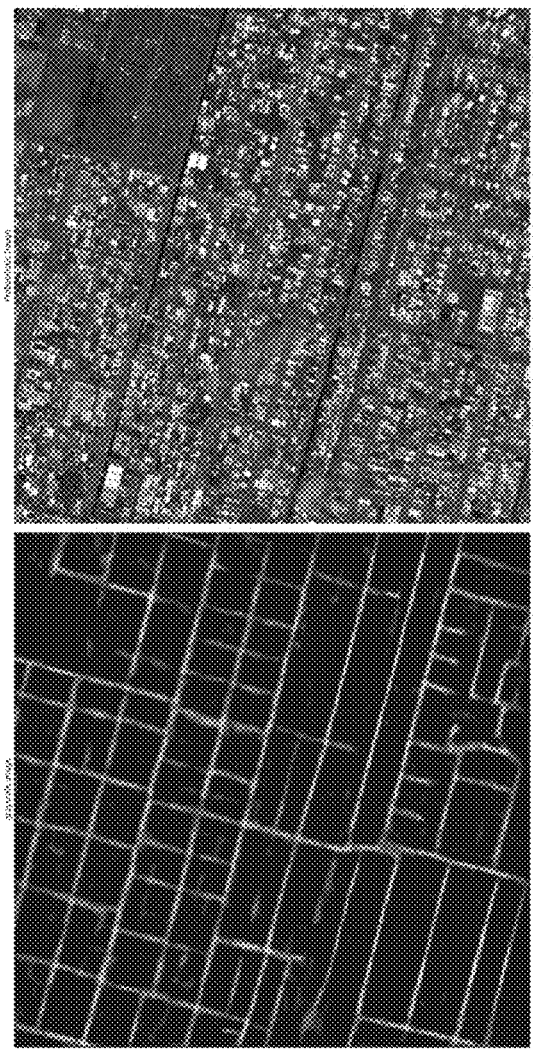
FIGS. 13A and 13B illustrate part of the method according to one or more illustrative aspects described herein.

For roads, a different form of post-processing may be used. For example, based on the road heat map such as that shown in FIG. 13(a), a set of LineString geometries for the roads may be created and overlaid onto the raster image, as shown in FIG. 13(b).

Once the machine learning model has been retrained for a particular geographic region in accordance with steps 1.2-1.8, it will be appreciated that the retrained machine learning model may be implemented each time new imagery 100 is received to automatically extract topographic features therefrom. In doing so, changes to the geographic region may be automatically identified, such as new topographic features, as well as the removal and/or modification of existing topographic features previously identified.

Figure 15:
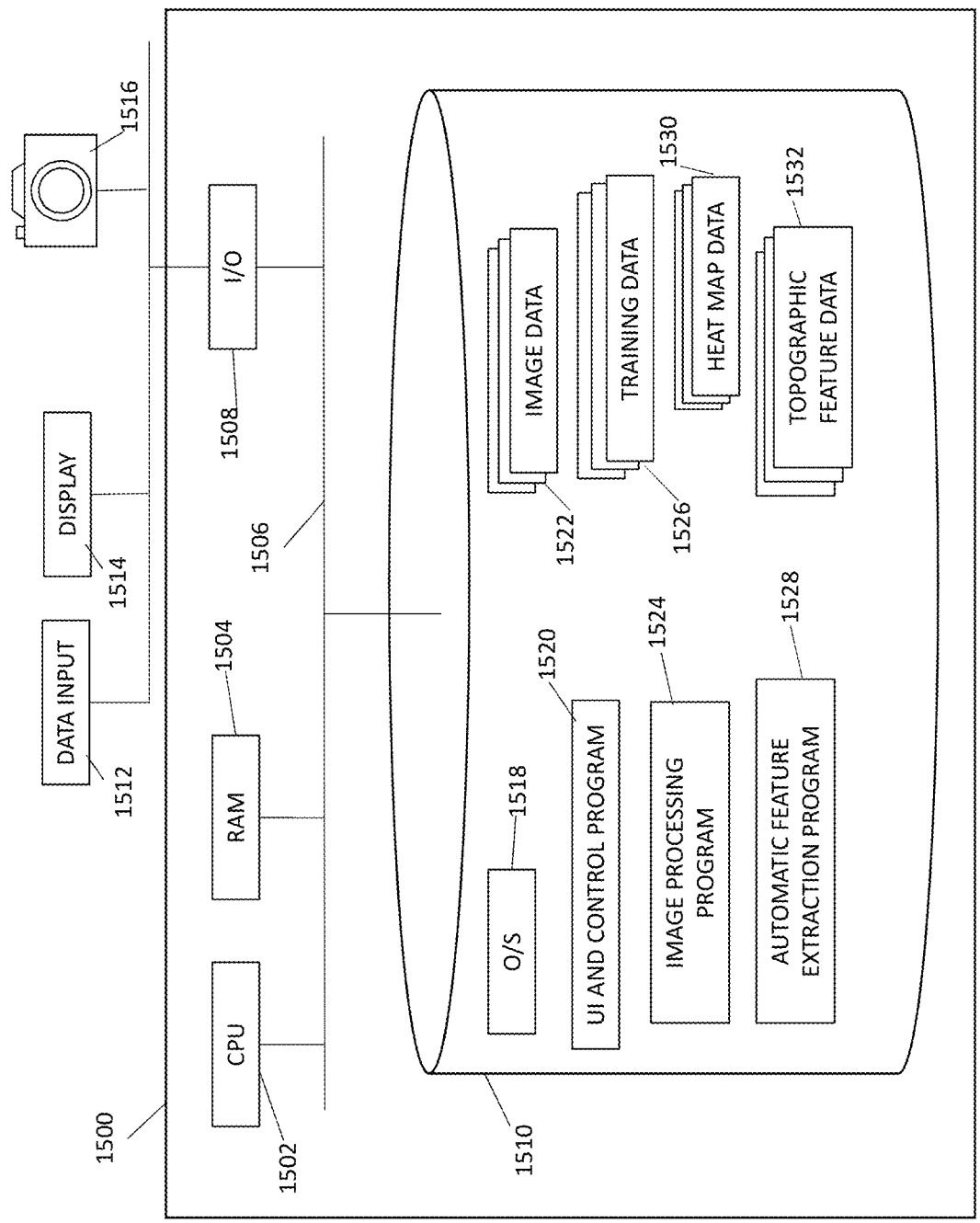
FIG. 15 is a block diagram illustrating a computer system on which one or more illustrative aspects described herein may be implemented.

FIG. 15 illustrates an example of a general computing device 1500 that may form the platform for aspects and embodiments described herein. In this example, the computing device 1500 comprises a central processing unit (CPU) 1502 and a working memory 1504, connected by a common bus 1506, and having an input-output (I/O) interface 1508 arranged to receive control inputs from a user via a device connected to a data input port 1512 such as a keyboard, mouse, touchscreen, push button, or other controller, and provide output information via a user interface which is displayed on a visual display device 1514 connected to the computing device 1500. The I/O interface 1508 is also arranged to receive further inputs via various other devices and sensors, including but not limited to an imaging device 1516.

The computing device 1500 is also provided with a computer readable storage medium 1510 such as a hard disk drive (HDD), flash drive, solid state drive, or any other form of general-purpose data storage, upon which stored data, such as image data 1522, training data 1526, heat map data 150 and topographic feature data 1532, and various other programs are arranged to control the computing device 1500 to operate in accordance with the present disclosure. For example, stored on the computer readable storage medium 1510 is an operating system program 1518 that when run by the CPU 1502 allows the system to operate. Also provided is an automatic feature extraction program 1528 which implements the machine learning model in order to provide the automatic feature extraction as described herein when run by the CPU 1502, as will be described in more detail below. An image processing program 1524 may also be provided for processing imagery from the imaging device 1516 to thereby derive the training data 1526 needed to optimise the pre-trained machine learning model implemented by the automatic feature extraction program 1528, as well as processing imagery for input to the optimised machine learning model for subsequent feature extraction. In order to interface with and control the image processing program 1524 and automatic feature extraction program 1528, a user interface and control program 1520 is also provided, that controls the computing device 1500 to provide a visual output to the display 1514, and to receive user inputs via any input means connected to the data input port 1512, or any other device connected to the I/O interface 1508 in order to control the image processing program 1524 and automatic feature extraction program 1528.

The computing device 1500 is capable of performing automatic feature extraction according to one or more illustrative aspects described herein, an illustrative embodiment of which will now be described.

As described previously, the imaging device 1516 collects aerial and/or satellite imagery of a geographic area, which may then be received by the computing device 1500 and stored as image data 1522 on the computer readable storage medium 710. This image data 1522 may then be input to the image processing program 1524 where it is processed in accordance with steps 1.2 to 1.6 of FIG. 1 described above to generate training data 1526 for input to the automatic feature extraction program 1528. It will of course be appreciated that the imagery used for optimising the machine learning model may be processed by some other computing means, the training data 1526 then being received by the computing device 1500 via the data input port 1512. In either case, the training data 1526 will then be input to the automatic feature extraction program 1528, where it will be used to optimise the pre-trained machine learning model in accordance with step 1.8 described above.

Once the pre-trained machine learning model has been optimised for a geographic area, new target imagery that is to undergo the feature extraction can then be received from the imaging device 1516 and stored as further image data 1522. This target image data 1522 is input to the image processing program 1524 to reformat the image data 1522 for input to the optimised machine learning model, in accordance with step 1.10 described above. As before, the target imagery may be processed by some other computing means, the reformatted image data then being received by the computing device 1500 via the data input port 1512.

Once the image data 155 has been reformatted, it is input to the automatic feature extraction program 1528, where it is input to the optimised machine learning model to generate heat maps for each class of feature, in accordance with steps 1.12 and 1.14. The resulting heat map data 1530 may be used to output the heat maps to a user via the visual display 1514. The automatic feature extraction program 1528 will then process the heat map data 1530 in accordance with the steps 1.16 and 1.18 to extract the topographic vector features therefrom, which may then be stored as topographic feature data 1532 and used to update a topographic database. This topographic feature data 1532 can be used to identify new topographic features, as well as changes to existing topographic features. The topographic feature data may also be used to generate updated map images of the geographic area.

Various modifications, whether by way of addition, deletion and/or substitution, may be made to all of the above described embodiments to provide further embodiments, any and/or all of which are intended to be encompassed by the appended claims.

The invention claimed is:

1. A computer-implemented method of generating a machine learning system for automatically identifying topographic features from image data corresponding to a geographic area, wherein the method comprises:
   receiving image data comprising at least a first image corresponding to a first geographic area, the first image comprising a plurality of pixels;
   processing the image data, wherein at least a portion of the first image is normalised in dependence on at least one spectral band of the plurality of pixels;
   labelling one or more topographic features of at least a first type of topographic feature within the processed image data;
   generating at least one further image from the processed image data in dependence on the labelling, wherein each of the plurality of pixels of the at least one further image has a value associated therewith such that pixels corresponding to the one or more topographic features of the first type of topographic feature have a first integer value;
   providing a pre-trained machine learning system configured to identify objects from image data, wherein the pre-trained machine learning system comprises a plurality of layers;
   inputting the at least one further image and the values associated therewith into the pre-trained machine learning system; and
   optimizing the pre-trained machine learning system based on the at least one further image by refining the plurality of layers based on the values associated with the pixels of the at least one further image, such that the optimized machine learning system is adapted to automatically identify topographic features of the at least the first type of topographic feature from target image data corresponding to at least the first geographic area.

2. A method according to claim 1, further comprising:
   receiving first target image data corresponding to a geographic area of interest;
   inputting the target image data to the optimized machine learning system;
   generating, using the optimized machine learning system, at least one heat map of the geographic area of interest, the at least one heat map comprising a plurality of pixels having an intensity value, wherein the intensity value is calculated in dependence on at least the first type of topographic feature; and
   processing the pixels of at least one heat map to thereby identify one or more topographic features of at least the first type of topographic feature.

3. A method according to claim 2, wherein the generating at least one heat map comprises analysing a pixel of the target image data, and determining a confidence measure based on a probability that the pixel corresponds to at least the first type of topographic feature, wherein the intensity of the pixel is indicative of the determined confidence measure.

4. A method according to claim 3, wherein the processing the pixels of the at least one heat map further comprises identifying one or more topographic features in dependence on the determined confidence measure.

5. A method according to claim 2, wherein the method further comprises generating one or more geospatial vectors in dependence on the identified topographic features.

6. A method according to claim 5, wherein the identified topographic features are buildings, and wherein the method further comprises processing the one or more geospatial vectors to align an orientation of the one or more geospatial vectors.

7. A method according to claim 2, wherein the method further comprises processing the image data to provide a plurality of image tiles for input to the optimised machine learning system, wherein each sub-tile has a portion of overlap with an adjacent sub-tile.

8. A method according to claim 7, wherein generating the at least one heat map of the first geographic area comprises generating a respective heat map for each sub-tile, wherein each respective heat map are summed together to provide the at least one heat map.

9. A method according to claim 1, wherein the processing the image data further comprises dividing the first image into a plurality of processed image tiles.

10. A method according to claim 9, wherein an intensity of the pixels within each processed image tile is normalised in dependence on a statistical analysis of the at least one spectral band of the plurality of pixels.

11. A method according to claim 9, wherein the generating at least one further image comprises dividing the plurality of processed image tiles into a plurality of sub-tiles and generating a plurality of further sub-tiles in dependence on the labelling, wherein each of the plurality of pixels of the further sub-tiles has a value associated therewith such that pixels corresponding to the one or more topographic features of the first type of topographic feature have the first integer value.

12. A method according to claim 11, wherein further sub-tiles containing a pre-determined number of pixels having the first integer value are identified for input to the pre-trained machine learning system.

13. A method according to claim 1, wherein the generating at least one further image comprises generating an image for each type of topographic feature.

14. A method according to claim 1, wherein the labelling one or more topographic features of at least the first type of topographic feature comprises generating a vector mask.

15. A method according to claim 1, wherein the at least the first type of topographic feature is at least one of: a building, and a road.

16. A method according to claim 1, wherein the pre-trained machine learning system is a deep neural network.

17. A method according to claim 1, wherein the pre-trained machine learning system comprises a plurality of layers, wherein a portion of the layers are configured to differentiate between different characteristics of objects, and wherein optimising the pre-trained machine learning system comprises refining the portion of layers based on the values associated with the pixels of the at least one further image.

18. One or more non-transitory computer readable media storing computer readable instructions that, when executed, configure a data processing system to perform:
   receiving image data comprising at least a first image corresponding to a first geographic area, the first image comprising a plurality of pixels;
   processing the image data, wherein at least a portion of the first image is normalised in dependence on at least one spectral band of the plurality of pixels;
   labelling one or more topographic features of at least a first type of topographic feature within the processed image data;
   generating at least one further image from the processed image data in dependence on the labelling, wherein each of the plurality of pixels of the at least one further image has a value associated therewith such that pixels corresponding to the one or more topographic features of the first type of topographic feature have a first integer value;
   providing a pre-trained machine learning system configured to identify objects from image data, wherein the pre-trained machine learning system comprises a plurality of layers;
   inputting the at least one further image and the values associated therewith into the pre-trained machine learning system; and
   optimizing the pre-trained machine learning system based on the at least one further image by refining the plurality of layers based on the values associated with the pixels of the at least one further image, such that the optimised machine learning system is adapted to automatically identify topographic features of the at least the first type of topographic feature from target image data corresponding to at least the first geographic area.

19. The non-transitory computer readable media of claim 18, wherein the computer readable instructions, when executed, further configure the data processing system to perform:
   receiving first target image data corresponding to a geographic area of interest;
   inputting the target image data to the optimized machine learning system;
   generating, using the optimized machine learning system, at least one heat map of the geographic area of interest, the at least one heat map comprising a plurality of pixels having an intensity value, wherein the intensity value is calculated in dependence on at least the first type of topographic feature; and
   processing the pixels of at least one heat map to thereby identify one or more topographic features of at least the first type of topographic feature.

* * * * *